May 15, 1923.

Re. 15,604

E. R. ALDERMAN

DOFFING APPARATUS

Original Filed Jan. 5, 1922 5 Sheets-Sheet 1

INVENTOR.
Eugene R. Alderman
BY Chapin & Neal
ATTORNEYS.

May 15, 1923.

Re. 15,604

E. R. ALDERMAN

DOFFING APPARATUS

Original Filed Jan. 5, 1922 5 Sheets-Sheet 2

INVENTOR.
Eugene R. Alderman
BY Chapin & Neal
ATTORNEYS.

May 15, 1923. Re. 15,604

E. R. ALDERMAN

DOFFING APPARATUS

Original Filed Jan. 5, 1922 5 Sheets-Sheet 3

INVENTOR.
Eugene R. Alderman
BY Chapin & Neal
ATTORNEYS.

May 15, 1923. Re. 15,604

E. R. ALDERMAN

DOFFING APPARATUS

Original Filed Jan. 5, 1922 5 Sheets-Sheet 4

INVENTOR.
Eugene R. Alderman
BY Chapin & Neal
ATTORNEYS.

May 15, 1923. Re. 15,604

E. R. ALDERMAN

DOFFING APPARATUS

Original Filed Jan. 5, 1922 5 Sheets-Sheet 5

INVENTOR.
Eugene R. Alderman
BY Chapin & Neal
ATTORNEYS.

Reissued May 15, 1923. Re. 15,604

UNITED STATES PATENT OFFICE.

EUGENE R. ALDERMAN, OF HOLYOKE, MASSACHUSETTS.

DOFFING APPARATUS.

Original No. 1,419,192, dated June 13, 1922, Serial No. 527,124, filed January 5, 1922. Application for reissue filed March 15, 1923. Serial No. 625,384.

*To all whom it may concern:*

Be it known that I, EUGENE R. ALDERMAN, citizen of the United States, residing at Holyoke, in the county of Hampden and State of Massachusetts, have invented new and useful Improvements in Doffing Apparatus, of which the following is a specification.

This invention relates to improvements in doffing mechanism for cap-spinning machines or the like and is directed particularly to mechanisms for simultaneously doffing caps having the usual unflanged smooth upper ends.

Doffing mechanisms have heretofore been devised, which employ caps of specially constructed upper ends known as flanged caps but it has been found that such flanged caps are not suitable for all kinds and conditions of spinning for which smooth caps are used. An object therefor of the present invention is the provision of a doffing apparatus that may be employed in a spinning machine without the necessity of providing specially constructed caps in place of the usual caps now commonly used in hand doffed machines.

A further object of the invention is the provision of means for simultaneously setting the fresh empty bobbins properly upon their respective whorls for driving connection therewith after the doffing operation is completed, thereby eliminating the individual hand setting of the bobbins upon their driving whorls heretofore required. Other objects and advantages of the invention will appear from the following description, while the embodiment of the invention as at present preferred is illustrated in the accompanying drawings in which.

Figure 9:
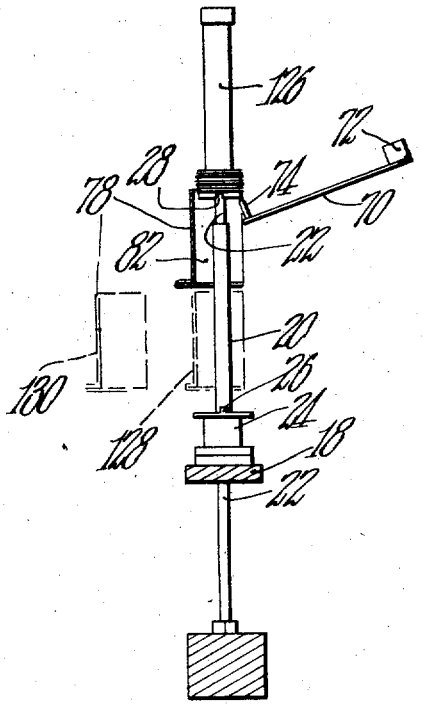
Figure 10:
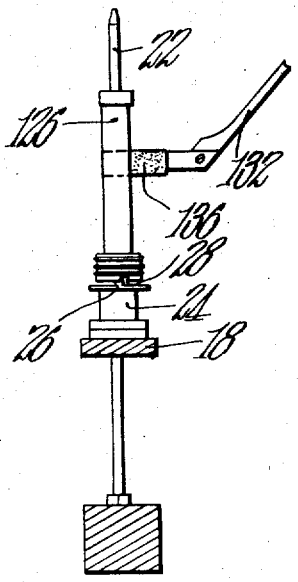
Figure 7:
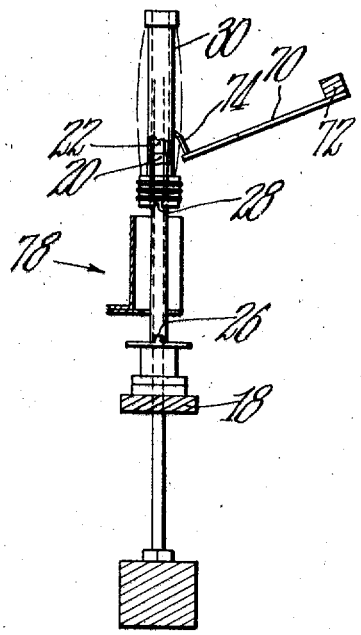
Figure 8:
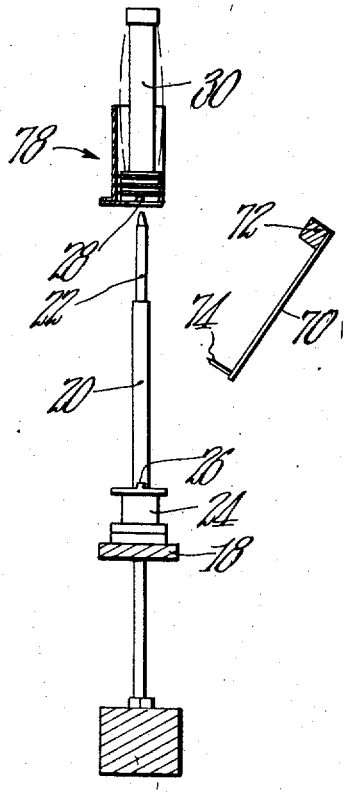

Figs. 7, 8, and 9 are sectional views showing certain of the parts in various steps of the doffing operation;

Fig. 10 is a sectional elevational view showing the bobbin setters in engagement with the bobbin.

So much of the operating mechanism of a spinning machine as cooperates with the doffing mechanism will now be described for the purpose of disclosing the invention in its present preferred form. The end frame of the spinning machine is indicated at 2, and as is well understood in the art, such machines are provided with a pair of end frames that are held or tied together in a spaced relation by upper and lower longitudinal rails or girders 4 and 6.

A spindle rail 8 is fixed to reciprocable racks 10 which are suitably guided for up and down movement in the lower girder rail 6. A shaft 12 mounted in suitable bearings 2′ of the end frames 2 is provided with an operating hand wheel 14 and has fixed thereto at intervals along its length, pinions 16 which are in meshing engagement with the several racks 10 carried by the rail 8. By this mechanism the rail 8 may be raised and lowered by hand when desired for the doffing operation. Spindles 22 are fixed to the rail 8 and project upwardly therefrom. A lifter plate 18 has fixed thereto depending rods 34 which extend through the spindle rail 8 and are slidably guided for vertical movement through the lower girder 6. Brackets 36 are fixed to the lower ends of the rods 34 and are connected with chains 38 to suitable operating mechanism (not shown) for raising and lowering the lifting plates 18 either automatically when the machine is running or by hand when the machine is stopped. Rotatably mounted on the lifting plate 18 by suitable bearings 24′ are the whorls 24 having fixed thereto the upwardly projecting tubes 20 through which the spindles 22 are adapted to extend. The whorls 24 are adapted to be driven by bands (not shown) and are provided with the usual key portions 26 adapted to engage suitable slots 28 at the lower ends of the bobbins for driving the latter during the spinning operation. In the drawings the full bobbins are indicated by reference number 30 and the empty bobbins by reference number 126. The spindles 22 are adapted to support at their upper ends the caps 32 of the usual construction having smooth, unflanged and tapering upper ends as shown.

Figure 3:
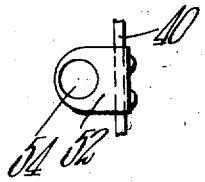
Fig. 3 is a plan view of one of the cap receiving guides.
Figure 4:
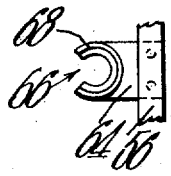
Fig. 4 is a plan view of one of the cap supporting members.
Figure 5:
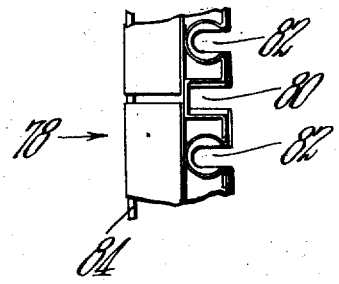
Fig. 5 is a plan view of a portion of the doffing carriage.

The mechanism for removing the caps during the doffing operation will now be described. Plates 40 are supported by reciprocable racks 42 and are moved horizontally to and from the spindles by means of gear segments 44 fixed to a shaft 46. The shaft 46 is rotatably supported in the end frames 2 and is operated by means of a lever 48. Brackets 50 secured to the end frames 2 serve as guides for the reciprocable racks 42. Guide members 52 for guiding the caps are carried by the upper of the plates 40 and as shown in Fig. 3 preferably comprise a plate having a circular opening 54 into which the upper ends of caps 32 may enter when raised to their elevated position by the spindles 22. Supporting bases 64 are fixed to an oscillating shaft 56. These bases as shown in Fig. 4 are arranged to support the caps 32 by engaging beneath the same. The shaft 56 is mounted in suitable bearings of brackets 58 which are secured to the lower plate 40 and is provided with an operating lever 60 at one end thereof by means of which the shaft may be swung. A catch 62 is carried adjacent one end of the upper plate 40 behind which the lever 60 may be placed to hold the shaft and supporting bases in the position shown in Fig. 2. Normally during the spinning operation the supporting bases are in the non-supporting position represented by dotted lines at 120 in Fig. 2.

It is important to construct these supporting bases 64 of a material which will be sufficiently soft, so as not to injure or burr the lower peripheral edge of the caps 32 when engaging the same, as otherwise the caps would be spoiled for spinning.

Figure 2:
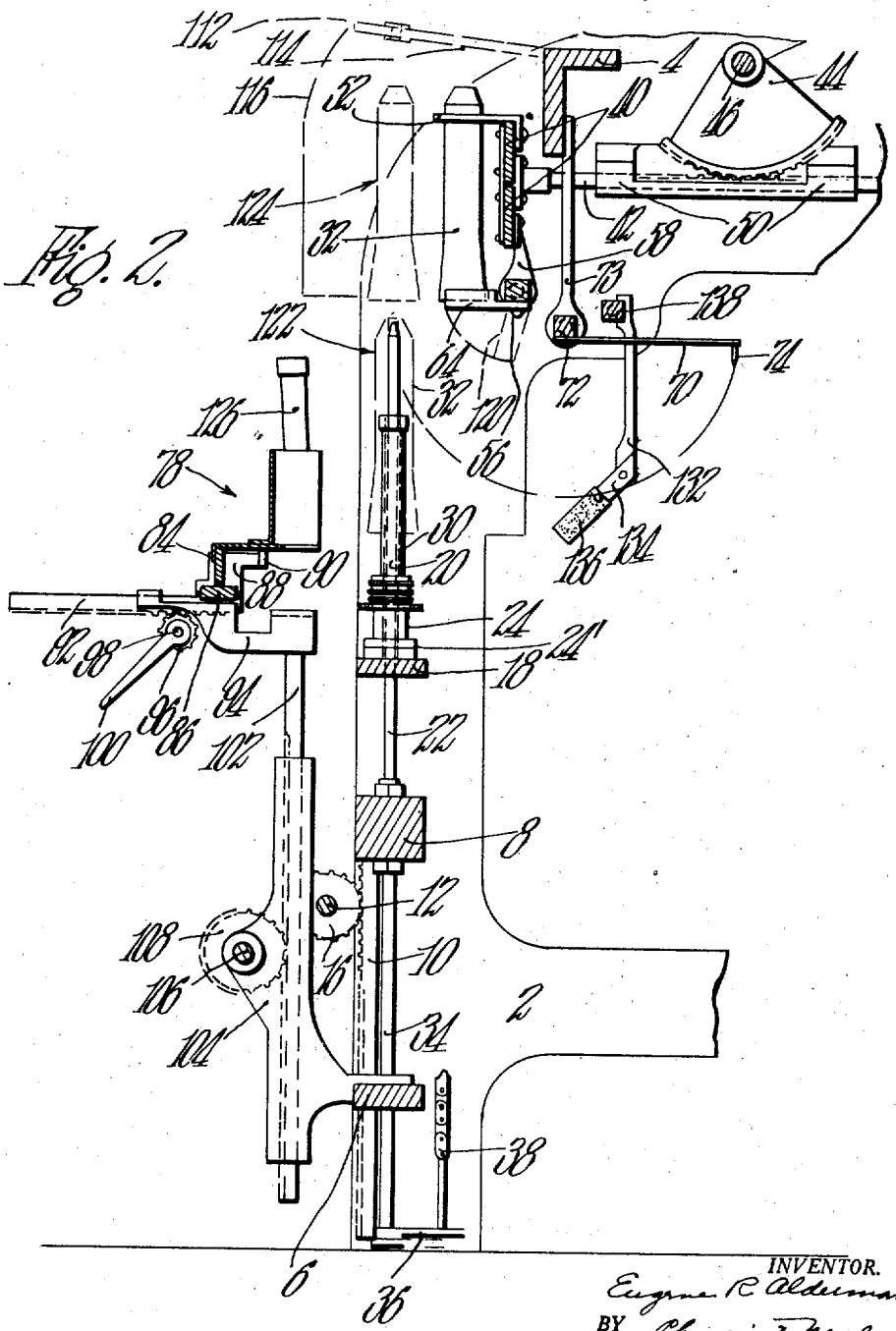
Fig. 2 is a sectional elevational view in conventional form of the spinning frame and showing the doffing mechanism applied thereto.

By moving the plates 40 forwardly in Fig. 2 the upper guides 52 may be alined over the spindles 22 and are in a position to receive the caps when they are elevated thereto. When the caps are elevated to a proper height the supporting bases may be swung by a rotation of the shaft 56 to engage the lower end of the caps 32, and in which position the periphery of the cap is encircled by the flange 68 of the bases 64 to hold the cap from displacement. Bobbin holders 70 are carried by a pivoted shaft 72 and are provided at their outer ends with pointed pins 74 for engaging the yarn or other material upon the full bobbins 30 and serve to hold the said bobbins from downward movement when raised to a desired position by the lifter plate as will later appear.

Figure 1:
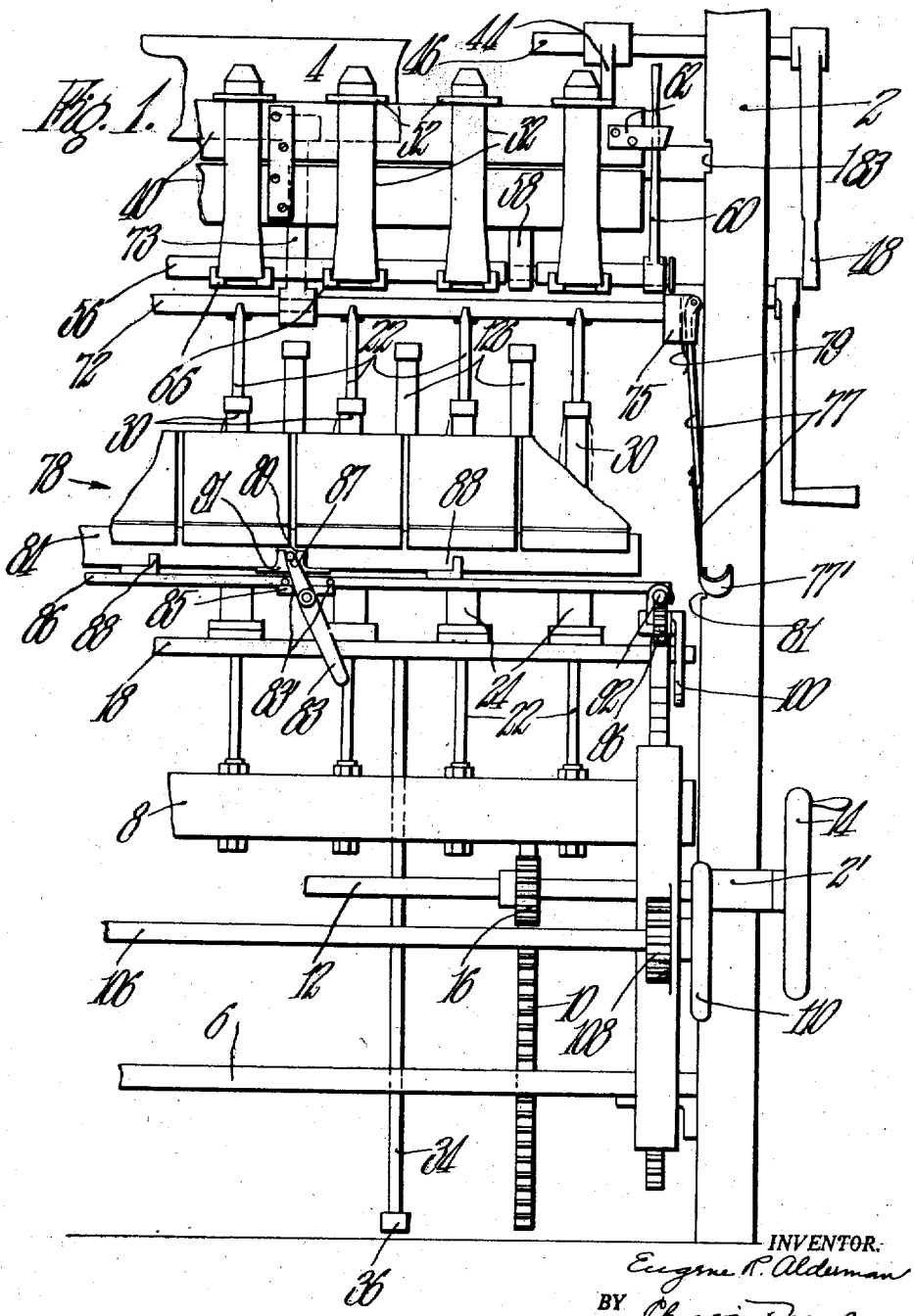
Fig. 1 is a front elevational view of a portion of a spinning machine with the doffing mechanism applied thereto.

The shaft 72 is pivotally mounted in suitable hangers 73 fixed to and depending from the cross-rail 4. A member 75 fixed to an end of the shaft 72 has pivoted thereto an operating lever 77, and a spring 79 carried by the member acts upon the pivoted lever 77 to force the same against the end frame 2. The lower or outer end of the lever is provided with a curved portion 77′ which serves as a convenient means for grasping the said lever. The shaft 72 may be swung to carry the bobbin holders from the inoperative position shown in Fig. 2 to the operative position shown in Figs. 7 and 9. To hold the shaft in these positions suitable notches 81 and 183 are provided in the frame 2 as shown in Fig. 1 into which the lever 77 is forced by the action of the spring 79.

The mechanism for removing full bobbins from their respective spindles and replacing the same with empty bobbins will now be described.

Figure 6:
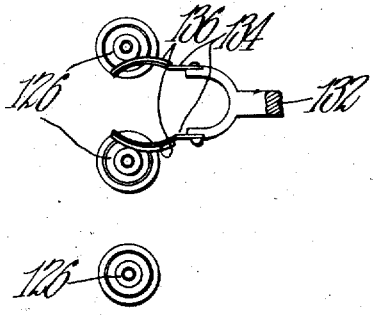
Fig. 6 is a plan view of the bobbin setting devices shown in engagement with the bobbins.

A carriage 78 comprising a plurality of alternating bobbin receiving and delivery pockets 80 and 82 is fixed to a laterally reciprocable bar 84. A supporting bar 86 has fixed thereto a plurality of guide members 88 in which the before mentioned bar 84 may be reciprocated. The lateral reciprocation of the bar 84 is accomplished by an operating lever 83 that is pivoted upon a bracket 85 fixed to the support bar 86 and carries a pin 87 on its upper end that is in sliding engagement with a slot 89 of a member 91 fixed to the reciprocable bar 84. By a movement of the lever 83 the bar 84 and carriage 78 carrying the bobbin pockets is moved to the right or left for locating the pockets in desired relations to the spindles 22. Suitable stops 83′ may be provided to limit the movement of said lever 83 in either direction. The supporting bar 86 is fixed to fore and aft reciprocable racks 92 preferably located at opposite ends thereof. These racks are in sliding engagement with suitable brackets 94 and may be reciprocated by pinions 96 fixed to shaft 98 to the end of which is fixed an operating handle 100. The brackets 94 are carried on vertically reciprocable racks 102 that are guided in suitable standards 104 secured to the lower girder rail 6 of the spinning machine. A shaft 106 rotatably mounted in the standards 104 has fixed thereto pinions 108 that are in meshing engagement with the racks 102. A hand wheel 110 secured to an end of the shaft 106 provides a means to rotate the shaft and consequently raise and lower the racks 102 and mechanism supported thereby. Bobbin setters comprising arms 132 (see Figs. 2 and 6) are fixed to a pivoted shaft 138 and have bifurcated or forked lower portions to which are secured curved spring like members 134. These members 134 are preferably of comparatively thin spring steel but may be of any other material of a similar nature. Friction strips or pads 136 of a rubber like material are carried on the outer faces of the members 134. The arms or bobbin setters may be moved by a swinging action of the shaft 138 from the position shown in Fig. 2 to that shown in Figs. 6 and 10 and as will be seen the resilient members will engage one side of the bobbins and slightly rotate the said bobbins about the spindles. The shaft 138 may be swung to carry the resilient members 134 past the engaged bobbins so as to have a diagonal wiping action back and forth against said bobbins. It will be noted also that this diagonal wiping action serves to slightly lift the bobbins and rotate them as the members 136 move beyond the position shown at Fig. 10 and then slightly depress the bobbins and rotate them as the members swing back to the position shown in Fig. 10. During the turning action the connecting devices, in the form illustrated being a key and slot, are brought into driving engagement. A thread guide 112 of usual construction and indicated by dotted lines is supported from the upper girder rail 4 and is hinged at 114 to allow the said guide to be tilted backward in the usual manner. Separator plates also indicated by dotted lines at 116 function in the usual manner and are carried by the said thread guide 112.

The operation of doffing will now be described. When the spinning mechanism is at rest the caps are removed from the spindles in the following manner: The plates 40 carrying the guides 52 and supporting bases 64 are moved forwardly to a position in which the openings in the guides are alined with their respective spindles, the bases 64 being in their inoperative position shown in dotted lines in Fig. 2. After the positioning of the guides 52 the spindle rail 8 and lifter plate 18 are elevated by hand in the usual manner to move or elevate the caps 32 from the dotted line position 122 to that indicated at 124 (see Fig. 2). This upward movement of the caps carries their upper smooth ends well into the openings 54 of the guides 52 which serves to retain them in an upright position. The bases 64 are next swung to their supporting position shown in Fig. 2 and engage the lower end of the caps, the peripheral edge of the caps being retained within the upstanding flanges 68 of the bases 64. The rail 8 is then lowered sufficiently to withdraw the spindles 22 from beneath the caps and the shaft 46 is then operated to slide the plate 40 and caps 32 backwardly to the position shown in solid lines in Fig. 2.

The removal of the full bobbins is now to be accomplished and the lifter rail is accordingly elevated to carry the bobbins to the height shown in Fig. 7. When in this raised position the bobbin holder shaft 72 is rotated to cause the bobbin holders 74 to engage the yarn upon the bobbins and functions to securely hold the bobbins in this elevated position while the lifter rail is again lowered to a position to allow the carriage 78 and pockets to enter between the bottom of the bobbin and top of the bobbin whorl 24.

The frame 78 is in the position shown in Fig. 2 and carries in its delivery pockets the empty bobbins 126. It is now moved to the position shown in Fig. 7 in which position the receiving pockets of the frame are located directly beneath the full bobbins 30 and enclose the spindles 22.

The bobbin holder shaft 72 is now turned to the position shown in Fig. 8 to release the bobbins and allow the same to fall within the receiving pockets of the carriage.

The carriage 78 is now moved upwardly until the lower end of the bobbins 30 clear the top of the spindles 22 (see Fig. 8) and by means of the lever 83 the full bobbins are moved laterally to a point between the spindles. This lateral movement of the carriage also locates a set of empty bobbins over and in alinement with the spindles. The bobbin holders are again swung to the location indicated in Fig. 9 and the carriage is lowered from the position shown in Fig. 8 to the dotted line position 128 shown in Fig. 9. This lowering of the carriage places the empty bobbins upon their respective spindles. During this lowering movement the lower ends of the bobbins are caught upon the members 74 which hold the empty bobbins from descent in order that the pockets may be withdrawn to the position indicated at 130 in Fig. 9. When the pockets are withdrawn to their normal position the supports 74 are swung to their inoperative position shown in Fig. 2 and the bobbins are allowed to drop upon the whorls as shown in Fig. 10. As the bobbins are thus dropped it is apparent that the connecting devices of the whorls and bobbins will not always engage but may be positioned somewhat after the manner indicated in Fig. 10. To insure the proper engagement of the parts the bobbin setters 132 are now lowered to the position shown in Fig. 10 which swinging action by the frictional engagement of the members 136 with the sides of the bobbins causes sufficient rotation of the bobbins to effect the connection of the bobbins and whorls for the spinning operation.

The caps 32 are now carried forwardly by the cap holding mechanism and are positioned above and in alinement with the spindles 22. When properly positioned the spindle rail 8 and the lifter plate 18 are elevated by hand, whereby, the upper ends of the spindles enter the caps and engage the same to support them in the usual manner. After the caps are engaged by the spindles the shaft 56 is swung to carry the supporting bases to the dotted line position indicated at 120. The spindle rail 8 and lifter plate 18 are next lowered to their operative spinning position and the cap supporting mechanism is then moved backwardly to the position shown in Fig. 2.

The full bobbins having been replaced by empty bobbins the spinning operation may be recommenced, it being understood that the yarn or other material may be attached to the empty bobbins by any suitable mechanism well known in the art.

It is apparent that many changes may be made in the invention to adapt it to various spinning machines. I, therefore, prefer not to be limited to the embodiment of the invention shown and described.

Claims:

1. The combination with a cap spinning machine having spindles and caps supported thereon, of doffing mechanism comprising annular members for loosely embracing the upper portions of said caps, and means for supporting the caps by engagement with the lower edges thereof in removing the caps from the spindles.

2. The combination with a cap spinning machine having vertically reciprocable spindles and caps supported thereon, of doffing mechanism comprising a cap holder frame having a reciprocable movement toward and away from said spindles, cap suspending devices carried on said holder frame movable relatively thereto for engaging the lower edges of said caps, and means for actuating said devices between reciprocations of said frame.

3. The combination with a cap spinning machine having vertically reciprocable spindles and caps supported thereon, of doffing mechanism comprising a cap holder frame having a reciprocable movement toward and away from said spindles, guides on said holder frame for the upper portions of said caps, suspending devices pivoted on said frame for engaging the lower edges of said caps, and means for swinging said cap suspending devices in and out from beneath said caps.

4. The combination with a cap spinning machine having reciprocable spindles and caps supported thereon, of doffing mechanism comprising a cap holder frame having a reciprocable movement toward and away from said spindles, guides fixed on said holder frame for embracing the upper ends of said caps, and bifurcated suspending devices pivoted on said frame for engaging the lower edges of said caps, and means for swinging said suspending devices in and out from beneath said caps.

5. The combination with a cap spinning machine having vertically reciprocable spindles and caps carried thereby, of doffing mechanism comprising members for steadying said caps by engagement with the sides thereof, means for positioning said members above said caps before the latter are elevated, and means movable relatively to said members and adapted to be positioned to support said caps subsequently to the elevation of the latter.

6. The combination with a cap spinning machine having vertically reciprocable spindles and caps carried thereby, of doffing mechanism comprising members for loosely embracing the sides of said caps to steady the same, means for positioning said members above said caps so that the caps will be projected through said members as the caps are elevated, and means for supporting said caps in their elevated positions.

7. The combination with a spinning machine having rotatable whorls for carrying bobbins, of bobbin setting mechanism comprising swinging arms having yielding fingers with friction surfaces to engage a plurality of bobbins and slightly rotate the same relative to their respective whorls for effecting driving connection therewith.

8. The combination with a cap spinning machine having spindles and rotatable whorls for carrying bobbins, of doffing mechanism for removing full bobbins and remounting empty bobbins on said whorls, and bobbins setting mechanism comprising yielding fingers with friction surfaces for engaging a plurality of said empty bobbins and slightly rotating the same relative to their respective whorls for effecting the driving connection therewith.

9. The combination with a cap spinning machine having spindles and caps supported thereon, of doffing mechanism comprising vertically swinging, cap suspending devices for engaging the lower edges of said caps, and manually operated means to positively swing said suspending devices beneath said caps to support the latter for removal from said spindles.

10. The combination with a cap spinning machine having spindles and caps supported thereon, of doffing mechanism comprising vertically swinging, cap suspending devices for engaging the lower edges of said caps, manually operated means to positively swing said suspending devices beneath said caps to support the latter for removal from said spindles, and means for latching said cap suspending devices in cap supporting position.

11. The combination with a cap spinning machine having spindles adapted to receive bobbins and caps supported on said spindles, of doffing mechanism comprising vertically swinging, cap suspending devices formed of bifurcated portions with fixed sides spaced apart to clear the bobbins on said spindles and having supporting engagement with only the caps of said spindles.

12. The combination with a cap spinning machine having vertically reciprocable spindles and caps supported thereon, of doffing mechanism comprising a cap holder frame having a movement toward and away from said spindles, cap steadying members fixed on said holder frame for loosely embracing the upper ends of said caps, and cap suspending devices pivotally carried on said frame and adapted to be swung beneath said caps to support the latter for removal from said spindles.

13. The combination with a cap spinning machine having a main frame, vertically reciprocable spindles adapted to receive bobbins and caps supported on said spindles, of doffing mechanism comprising a cap holder frame having a movement toward and away from said spindles, cap steadying members on said holder frame for the upper ends of said caps, cap suspending devices on said holder frame for engaging the lower ends of said caps to support the latter for removal from said spindles, and bobbin suspending devices on said main frame arranged to engage and support said bobbins when the caps are removed from the spindles.

14. The combination with a cap spinning machine having a main frame, vertically reciprocable spindles adapted to receive bobbins and caps supported on said spindles, of doffing mechanism comprising a cap holder frame having a movement toward and away from said spindles, cap steadying members on said holder frame for the upper ends of said caps, cap suspending devices on said holder frame for engaging the lower ends of said caps to support the latter for removal from said spindles, bobbin suspending devices on said main frame arranged to engage and support said bobbins when the caps are removed from the spindles, a carriage having adjacent pockets to receive full and empty bobbins, and means to move said carriage to locate said pockets in and out of axial alignment with said spindles.

15. The combination with a cap spinning machine having a main frame, vertically reciprocable spindles adapted to receive bobbins and caps supported on said spindles, of doffing mechanism comprising a cap holder frame having a movement toward and away from said spindles, cap steadying members on said holder frame for the upper ends of said caps, cap suspending devices on said holder frame for engaging the lower ends of said caps to support the latter for removal from said spindles, and bobbin suspending devices comprising vertically swinging hook members pivoted on said main frame and arranged to engage and support said bobbins when the caps are removed from the spindles.

16. The combination with a cap spinning machine having a main frame, vertically reciprocable spindles adapted to receive bobbins and caps supported on said spindles, of doffing mechanism comprising a cap holder frame having a movement toward and away from said spindles, cap steadying members fixed on said holder frame for loosely embracing the upper ends of said caps, cap suspending devices pivotally carried on said holder frame adapted to be swung beneath said caps to support the latter for removal from said spindles, and bobbin suspending devices movably mounted on said main frame and arranged to engage and support said bobbins when the caps are removed from the spindles.

17. The combination with a cap spinning machine having a main frame, vertically reciprocable spindles adapted to receive bobbins and caps supported on said spindles, of doffing mechanism comprising a cap holder frame having a movement toward and away from said spindles, fixed steadying members on said holder frame for loosely embracing the upper ends of said caps, cap suspending devices pivotally carried on said frame adapted to be swung beneath said caps to support the latter for removal from said spindles, and bobbin suspending devices comprising vertically swinging hook members pivoted on said main frame and arranged to engage and support said bobbins when the caps are removed from the spindles.

18. The combination with a cap spinning machine having a main frame, vertically reciprocable spindles, bobbins and caps supported on said spindles, of doffing mechanism comprising a cap holder frame having a movement toward and away from said spindles, cap steadying members fixed on said holder frame for loosely embracing the upper ends of said caps, cap suspending devices pivotally carried on said holder frame adapted to be swung beneath said caps to support the latter for removal from said spindles, bobbin suspending devices movably mounted on said main frame and arranged to engage and support said bobbins when the caps are removed from the spindles, a carriage having adjacent pockets to receive full and empty bobbins, and means to move said carriage to locate said pockets in and out of axial alignment with said spindles.

19. The combination with a spinning machine having spindles and whorls adapted to receive bobbins, of bobbin doffing mechanism for replacing full bobbins with empty bobbins on said whorls, of bobbin setting mechanism comprising friction engaging devices, and means to operate the same independently of said doffing mechanism so as to give them a wiping action back and forth against said bobbins for setting said bobbins into driving engagement with said whorls.

20. The combination with a spinning machine having spindles and whorls adapted to receive bobbins, of bobbin setting mechanism comprising a rock shaft with a plurality of friction engaging devices carried thereby, and arranged to have a wiping action back and forth against said bobbins for setting said bobbins into driving engagement with said whorls.

21. The combination with a spinning machine having spindles and whorls adapted to receive bobbins, of bobbin setting mechanism comprising friction engaging devices arranged to have a diagonal wiping action back and forth against said bobbins to first lift and rotate the same and then depress and rotate the same relative to said whorls for setting said bobbins into driving engagement with said whorls.

22. The combination with a spinning machine having spindles and whorls adapted to receive bobbins, of bobbin setting mechanism comprising a rock shaft, and a plurality of arms carried by said rock shaft and having yielding fingers with friction surfaces for engaging said bobbins to rotate the same slightly relative to said whorls for setting the bobbins into driving engagement with said whorls.

23. The combination with a spinning machine having spindles and whorls adapted to receive bobbins, of bobbin setting mechanism comprising a rock shaft, and a plurality of arms carried by said rock shaft, each arm having a pair of yielding fingers with friction surfaces adapted to pass between a pair of bobbins upon adjacent whorls and rub against the same.

24. The combination with a spinning machine having spindles and whorls adapted to receive bobbins, of bobbin setting mechanism comprising a plurality of movably mounted arms, each arm having a pair of yielding fingers with friction surfaces adapted to pass between a pair of bobbins upon adjacent whorls and rub against the same.

EUGENE R. ALDERMAN.